July 1, 1958  A. F. PARIS  2,841,315
SWEATER PRESSING AND FINISHING MACHINE
Filed June 1, 1956  7 Sheets-Sheet 1

INVENTOR.
August F. Paris
BY Green McCallister & Miller

HIS ATTORNEYS

July 1, 1958 A. F. PARIS 2,841,315
SWEATER PRESSING AND FINISHING MACHINE
Filed June 1, 1956 7 Sheets-Sheet 4

INVENTOR.
August F. Paris
BY Green McCallister&Miller
HIS ATTORNEYS

July 1, 1958 A. F. PARIS 2,841,315
SWEATER PRESSING AND FINISHING MACHINE
Filed June 1, 1956 7 Sheets-Sheet 5

Fig. 19
Fig. 19A
Fig. 20

INVENTOR.
August F. Paris
BY
HIS ATTORNEYS

Fig. 24

United States Patent Office 2,841,315
Patented July 1, 1958

2,841,315

SWEATER PRESSING AND FINISHING MACHINE

August F. Paris, Brockway, Pa.

Application June 1, 1956, Serial No. 588,828

12 Claims. (Cl. 223—70)

This invention relates to apparatus for shrinking, shaping, pressing and finishing sweaters and other knitted outerwear garments and has for an object to produce such apparatus for use by garment manufacturers in the final processing of knitted garments and also for use by cleaning and/or pressing establishments in pressing, finishing and reshaping of garments such as sweaters and other outerwear garments made from knitted fabrics.

A further object is to produce improved apparatus for pressing, finishing and otherwise processing knitted outerwear garments which apparatus may be readily adjusted to accommodate garments of different sizes and also of different shapes.

A still further object of the invention is to produce apparatus of the type indicated, which is equipped with separate sleeve finishing equipment capable of being readily adjusted to receive the sleeve portions of garments to be processed and also capable of delivering a separate supply of both steam and heated air to each sleeve of the garment as the other portions of the garment are being processed.

A still further object is to produce pressing and finishing apparatus for outerwear garments made from knitted fabrics which apparatus may be effectively employed in the operation of pressing, shaping and finishing of new garments preliminary to packing the same for shipment, or which may be just as effectively employed in the operation of pressing, shaping and finishing such garments after they have been subjected to cleaning operations.

In the drawings accompanying and forming a part hereof.

As noted, the apparatus illustrated is primarily intended as pressing and finishing machine for garments from knitted fabrics. The apparatus includes a base portion 21 which encloses means for delivering steam and/or heated air to the interior of a garment located on the machine and being processed. As shown, the base portion is provided with a converging or cone shaped portion 22 which serves as a director of both steam and air employed in the processing of garments. The base portion also provides a socket shaped support for receiving and supporting a center column or center port 23 which in turn support structural features of the apparatus such as a neck and shoulder portion 24 and a pair of laterally movable expander elements which are adjustable for the purpose of adapting the apparatus to receive and support garments of different sizes and shapes.

Figures 1, 2:
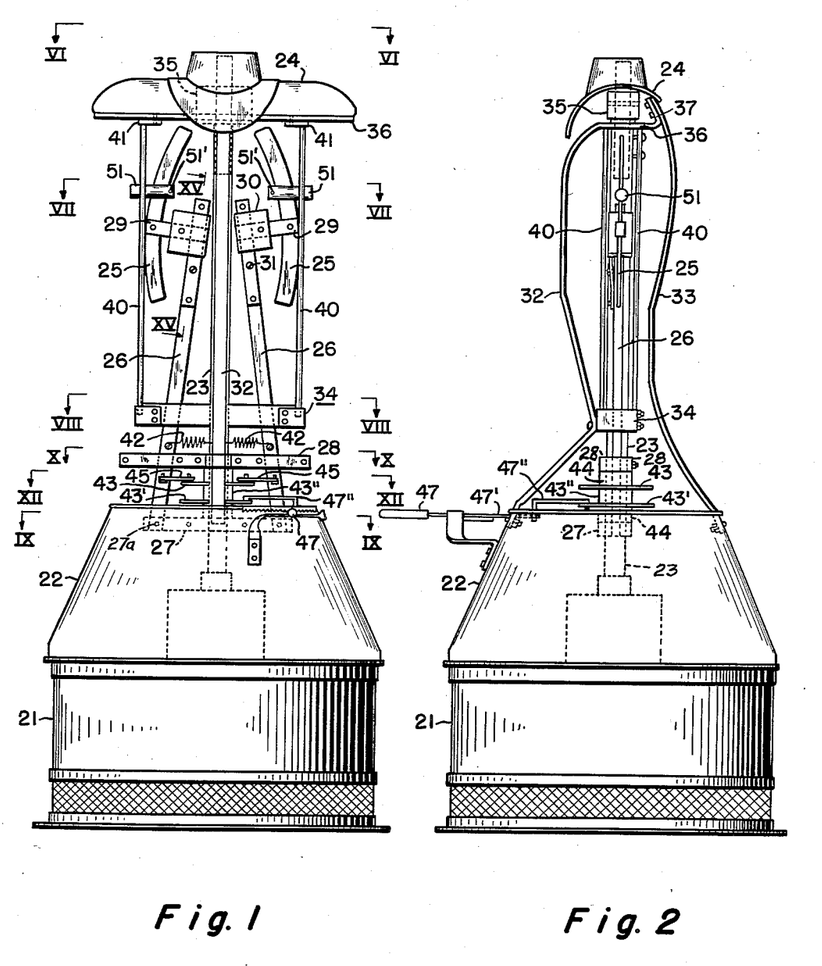
Figure 1 is a front elevation of pressing and finishing apparatus embodying my invention.
Figure 2 is a side elevation of the apparatus shown in Figure 1.
Figures 3, 7, 8, 9:
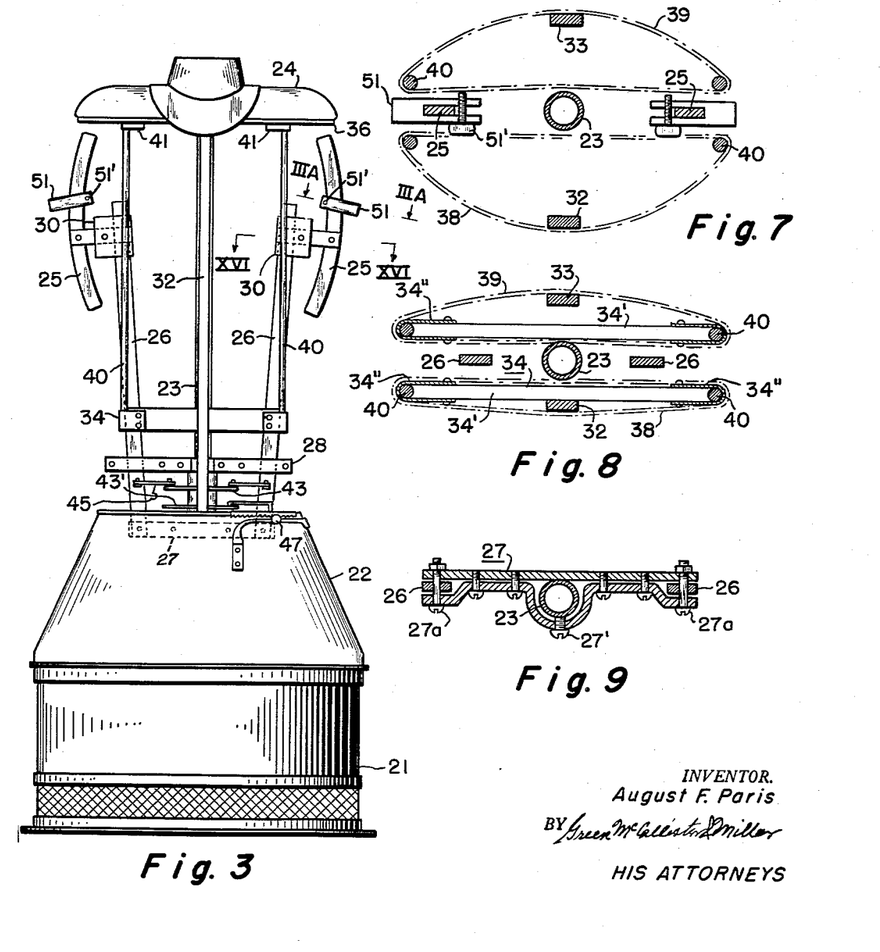
Figure 3 is a view corresponding to Figure 1 and showing portions of the apparatus moved to a position to press and finish a large size sweater or similar garment.
Figure 7 is an enlarged sectional view along the line VII—VII of Figure 1 but disclosing the apparatus there illustrated as equipped with fluid disseminating fabric shields.
Figure 8 is a somewhat enlarged sectional view along the line VIII—VIII of Figure 1 and illustrates the pressing apparatus as equipped with a fabric skirt portion arranged to direct and disseminate fluid pressure such as steam and air under pressure.
Figure 9 is an enlarged sectional view taken along the line IX—IX of Figure 1.
Figure 3A:
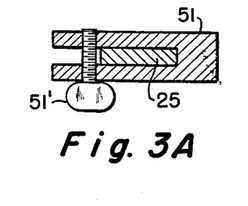
Figure 3A is a sectional view taken along the line IIIA—IIIA of Figure 3.

The laterally adjustable elements include laterally movable expander bars 25 for engaging the side portions of the interior of the body of a garment such as a sweater. As shown, each expander bar 25 is carried by a pivoted support arm 26 and is adjustable to different positions along that arm. As illustrated in Figures 1 and 9, each of the support arms 26 is pivotally supported on a frame structure 27 which, as illustrated, consists of two bars secured together in spaced relationship and so formed as to embrace the center post 23 to which they are clamped or secured by a set screw 27′. Each support arm 26 is shown fulcrumed on a bolt 27a carried by the frame portion 27 and located adjacent the end of the frame portion. Each arm 26 extends upwardly between a pair of guide bars 28 clearly illustrated in Figure 10. The bars 28 are so secured together that they embrace the center post 23 and are shown secured to the post by means of a set screw 23'.

Figures 10, 11, 12, 13, 14, 15, 16, 17, 18:
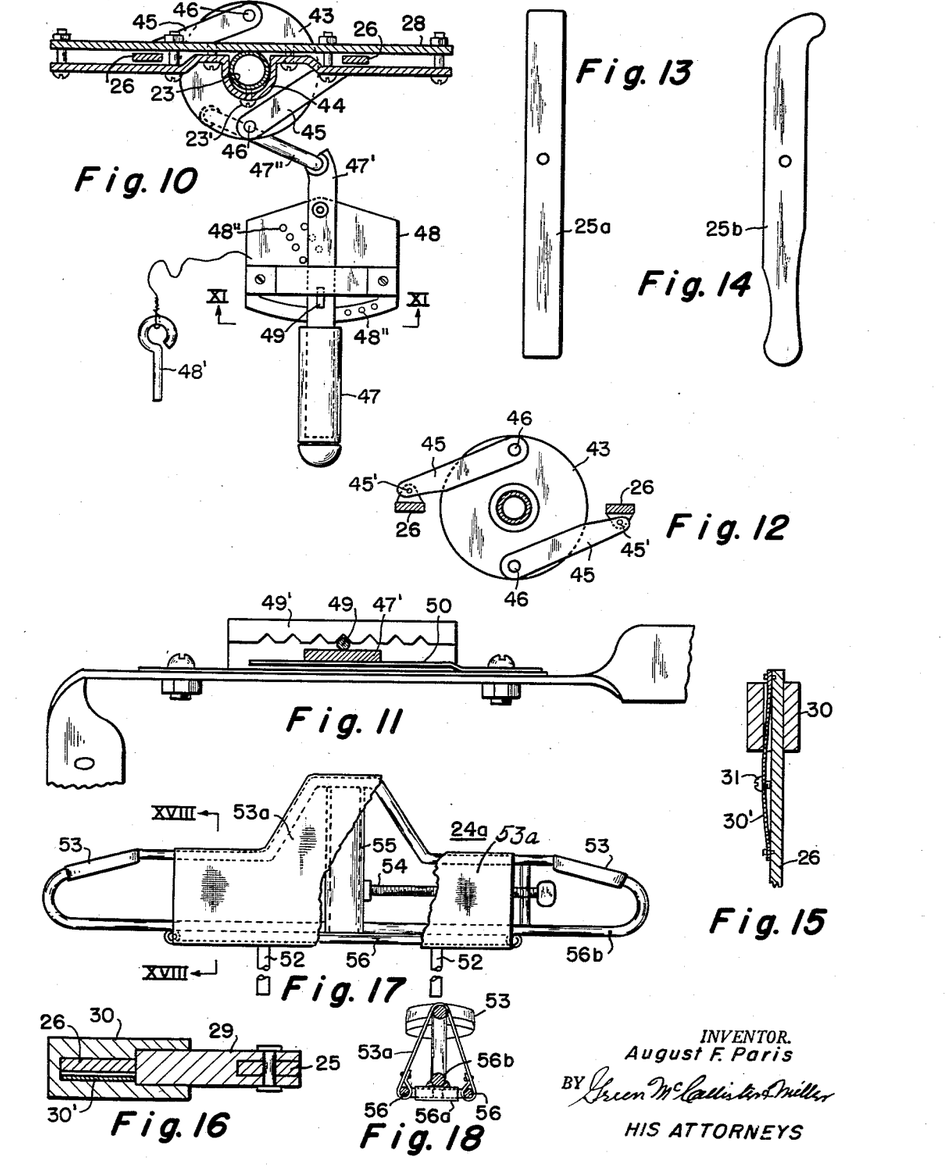
Figure 10 is an enlarged sectional view taken along the line X—X of Figure 1.
Figure 11 is a sectional view along the line XI—XI of Figure 10.
Figure 12 is an enlarged sectional view along the line XII—XII of Figure 1.
Figures 13 and 14 are accessory parts which may be employed as replacements of other parts forming a part of the apparatus illustrated in Figures 1, 2 and 3.
Figure 15 is an enlarged fragmental sectional view along the line XV—XV of Figure 1.
Figure 16 is an enlarged sectional view along the line XVI—XVI of Figure 3.
Figure 17 is a front elevation of a shoulder and neck supporting portion which may be employed as a part of the apparatus illustrated in Figures 1, 2, and 3.
Figure 18 is a sectional view along the line XVIII—XVIII of Figure 17.

As shown in Figures 1 and 3, each expander bar 25 is pivotally secured to the end of a finger bar 29 which is carried by a base block 30. Each block 30 is slidably mounted on one of the arms 26. Figure 15 discloses the base block 30 as normally held in different adjusted positions along its support arm 26, by means of a leaf spring 30' which is rigidly secured to the arm 26 and so arranged that the intermediate portion thereof is adjustable toward and away from the arm by means of a screw connection 31.

The garment supporting portion of the apparatus illustrated, includes the neck and shoulder portion 24, a front bar 32, a rear bar 33 and a substantially rectangular frame portion 34 clearly shown in Figure 8 as including in its make-up two bars 34' located in embracing relationship to the center post 23, and each having an end strap 34" secured to each end thereof. The frame portion 34 is secured to the center post 23 and, as shown, one of the bars 34' is secured to the front bar 32.

Figure 5:
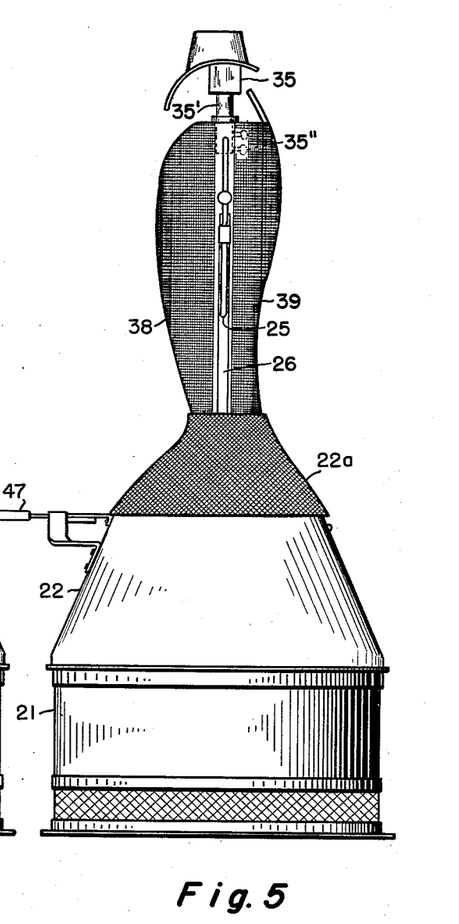
Figure 5 is a side elevation of the apparatus shown in Figure 4 and illustrates the location and arrangement of the fluid disseminating fabric parts or shields with which the pressing machine may be equipped.

The neck cap and shoulder portion 24 is carried by an adjustable block 35 which, as shown in Figure 5, is provided with a neck-like extension 35'. The extension 35' projects into the upper end of the center post 23 and is adapted to be secured in different positions relatively thereto, by means of set screws 35". The upper end of the front bar 32 is secured to a cross plate 36 which is in turn secured to the upper end of the center post 23 and is apertured to receive the neck portion 35' of the shoulder support block 35. As shown in Figure 2, the upper end of the rear bar 33 is secured to the plate 36 by means of an angle member 37 which forms a part of the center post assembly elements.

The front and rear portion of the apparatus described is partially enclosed by what may be termed fabric shields 38—39. In the apparatus illustrated these shields extend from the plate 36 to the frame portion 34 and the fabric which constitutes each shield is shown as supported by a pair of support rods 40. The preferred arrangement is to provide a vertical hem at each lateral edge of each shield, which hem is adapted to receive one of said rods 40.

Figure 6:
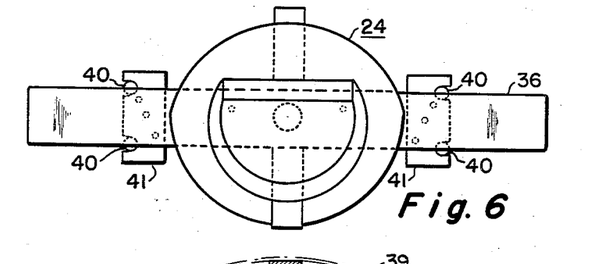
Figure 6 is an enlarged plan view as if taken from the line VI—VI of Figure 1.

As shown in Figure 6, the plate 36 carries on its lower face two spaced plates 41, each of which is notched on its outer edge so as to receive the upper ends of two of the support rods 40. Figure 8 discloses that the ends of each of the bars 34' is so notched that the bar and the adjacent strap portion 34" provide a socket for receiving the lower end of one of the rods 40. Thus it will be apparent that the front and rear portion of the apparatus is enclosed by the shields 38—39, but the shields are spaced from each other to accommodate the lateral movement of the expander bars 25 and their supporting arms 26.

As shown in Figure 1, the operating mechanism for the bars 25 and their support arms 26, includes coiled springs 42 and a spool shaped element consisting of two circular discs 43—43' secured in spaced relationship to a circular hub portion 43". The spool shaped element is apertured and rotatably mounted on the center post 23. Spacer collars 44 are located above and below the disc-carrying hub portion 43", the lowermost collar being supported on the frame structure 27 and the uppermost collar being located between the hub portion 43" and the guide bars 28. Each collar surrounds the center post. One of the springs 42 is secured to one of the arms 26 and the other spring is similarly secured to the other of such arms. Both springs are secured to the center post 23 and each may be termed a retraction spring because the tension thereof tends to hold the attached arm 26 in the innermost position as shown in Figure 1.

Each of the arms 26 is operatively connected to the uppermost disc 43 of the spool shaped element, by means of a separate pusher bar 45. One end of each such bar is pivotally secured to a pin 45' carried by a lug secured to one of the arms 26. The other end of each pusher bar is pivotally secured to a separate pin 46 carried by the disc 43 and shown in Figure 1 as projecting upwardly. Figure 12 discloses that the disc carried pins 46 are eccentrically mounted and so arranged that when the disc as shown in Figure 12 is turned in a counterclockwise direction, the pusher bars 45 will swing the arms 26 outwardly toward or to the positions of those bars illustrated in Figure 3.

The pusher bars are actuated by manually operated handle 47 mounted on a bar 47' which is pivotally mounted on a selector plate 48, operatively secured to the cone portion 22 of the base portion. The pull of the springs 42 on the arms 26 tends to move the disc 43 in a clockwise direction as illustrated in Figures 10 and 12. Such a movement throws the handle portion 47 to the right as illustrated in Figures 1 and 10, it being noted that the bar 47' is operatively connected to the lower disc 43' by means of a connecting rod 47". The plate 48 is shown as provided with a plurality of apertures, each of which is adapted to receive a pin 48' for the purpose of limiting the handle-actuated movement of the bar 47'. Each of the apertures 48" is so located as to designate a garment size, i. e., an adjustment of the machine to properly finish a garment of a particular size. When a manufacturer of sweaters or similar garments is pressing and finishing a number of such garments, all of the same size, it is convenient and time-saving to place the pin 48' in one of the size-designating apertures 48". By so doing, the handle 47 and the apparatus actuated by it can be quickly and accurately moved to the proper size position for each such garment after the expander members 25 have been retracted in the operation of removing a finished garment and replacing it by a garment to be processed and finished.

It will be understood that as the expander members 25 are moved outwardly by an expanding movement of the actuating mechanism, the sweater or other garment on the machine is placed under tension by the force applied to it by the members 25. A pawl and detent mechanism as illustrated in Figures 10 and 11 is provided for the purpose of holding the arms 26 in the position to which they are moved by the handle portion 47. As shown in Figures 10 and 11, the bar 47' carries a finger 49 which engages a ratchet bar 49' secured to the plate 48 and located above the bar 47'. A leaf spring 50 supports the handle end of the bar 47' and tends to hold the detent finger 49 in one or another of the notches of the notched bar 49'. Thus the detent mechanism will hold the expander members 25 in the position to which they are moved by the actuating handle 47 and, on releasing the detent mechanism, the support arms 26 and the members 25 will be retracted to their innermost positions by the springs 42.

In Figures 1, 3, 3a and 7, I have shown each of the expander members 25 as provided with an armhole-engaging pin 51 which is shown bifurcated at one end and adapted to be clamped to the supporting member 25 by means of a set screw 51'. These pins are adapted to project into the armholes of the sweater or other garment on the machine, and each is so positioned on an expander member 25 as to place the boundary edge of the armhole under just sufficient tension to properly shape the armhole and the portion of the sleeve attached thereto, when the members 25 are swung to garment-engaging positions.

While the neck cap and shoulder portion 24, as shown in Figures 1 to 5 inclusive, has been referred to as a single element, it should be noted that the cap and shoulder portion may be formed of metal and formed as a single part. When so formed it is desirable to provide grooves along the top portion of the shoulder portion on each side of the neck portion with each groove extending from the neck cap to the tip of the shoulder portion. These grooves are indents in the metal of the shoulder portions and are of such width that they receive the seams, if any, which are formed in the garment and extend lengthwise of the shoulder portion from the neck portion of the garment.

Figure 4:
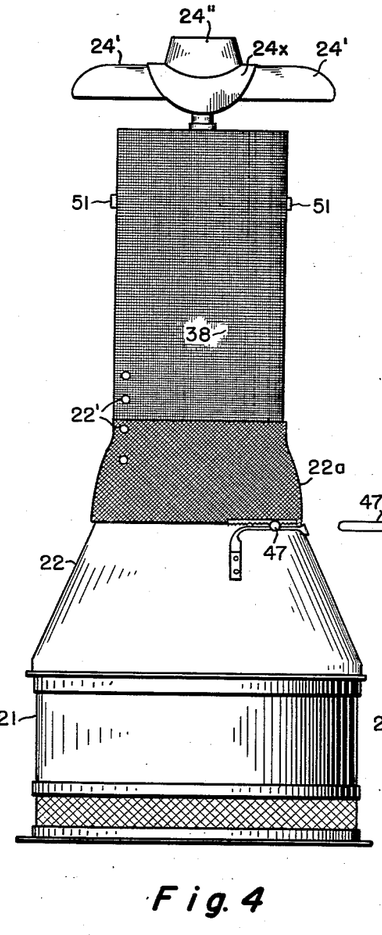
Figure 4 is a front elevation of the apparatus shown in Figure 1 equipped with a fabric covering, adapted to constitute a form or fluid disseminating shield over which garments to be processed are fitted preliminary to pressing, finishing or other processing.

It should also be noted that the shoulder portions designated in Figure 4 by the reference characters 24', may be and generally are formed of permeable material so that processing steam and air are delivered through them to the shoulder portions of the garment on the machine. When the shoulder portions are so formed it may be desirable to form the neck cap 24'' of metal or other impermeable material, to protect the elastic ribbed neck portion of a sweater from being damaged by the hot steam delivered to the rest of the garment. Under such conditions, it is also desirable to provide an impermeable baffle plate 24x around the neck cap, as shown in Figure 4. It will, of course, be understood that the neck cap and the baffle 24x may be formed of metal such as stainless steel, aluminum or brass.

In Figures 13 and 14 I have disclosed separate expander bars 25a and 25b which may replace the bar 25 as shown in Figures 1 and 3. Bars 25a such as illustrated in Figure 13, are to be used in the processing and shaping of garments in which the portions thereof below the armholes are substantially tubular. Bars 25b such as shown in Figure 14, are to be employed in the processing of garments having straight chest portions but which are narrow at the waistline.

The neck and shoulder portion shown in Figure 17 is to be employed in place of the neck and shoulder 24 when it is desirable or necessary to deliver both steam and air to the neck and shoulder portions of the garment being processed. As shown, the portion 24a illustrated in Figures 17 and 18, consists essentially of a metal frame so shaped as to form a support for the shoulder and neck portion of a garment. This frame is adapted to be secured to the upper end of the center post 23 and, for this purpose, is provided with downwardly projecting, spaced pins 52 which are arranged to pass through positioning apertures, not shown, but provided in the cross brace 36 (Figure 1 and Figure 2) so as to properly position the part 24a with relation to the other structural parts of the machine. As indicated in Figure 17, the frame portion is provided with spoon shaped metallic shoulder supporting portions 53, one of which is located adjacent each lateral tip of the frame portion. An elongated wing bolt 54 is secured to the tubular portion 55 which is adapted to receive the upper end of the center post 23. The wing bolt, in effect, constitutes a set screw for securing the shoulder portion 24a to the center post.

As indicated in Figure 17, the neck portion and a part of the shoulder supporting portion of the frame shown in Figures 17 and 18, are enveloped by a fabric form 53a which is fitted over the upper frame member and is secured along its lower edges to extensions 56 which are located on opposite sides of the bottom member of the frame. Each extension 56 may be formed of heavy wire, one end of which is secured in place within a tubular cross bushing 56a secured ot the lower portion of the frame and extending transversely across that portion. There are two of these cross bushings 56a located in spaced relationship and one of the extensions 56 is secured to one such bushing 56a while the other extension is secured to the other bushing. Each bushing is, therefore, open at one end and is adapted to receive the curved end of the extension 56 which is secured to the other bushing. That is to say, one end of each extension is secured to one end of one bushing and its other end is adapted to be loosely fitted into the open end of the other bushing. The extensions are flexible enough to accommodate the necessary movement of the free end portions thereof and the hem portions formed along the lower edges of the fabric covering 53a are adapted to fit over the extensions 56 and thus hold the fabric form in place on the shoulder and cap portion 24a.

It will be apparent that the conical portion 22 which is shown as a part of each of Figures 1 to 5 inclusive, delivers steam and air upwardly and into the garment supported on the machine. The conical portion may be made of aluminum or other sheet metal or of an impermeable plastic material. For the purpose of directing the processing fluid, i. e., the steam and air, upwardly and into the garment supported on the machine, I provide a fabric skirt 22a which is shown as encircling the upper edge of the conical portion 22 and extending from that edge up to, and around the substantially rectangular frame portion 34 which includes in its make-up the two bars 34'. The skirt portion is preferably made of double nylon material having a bottom hem which extends around and fits snugly against the upper edge of the portion 22. The skirt may be held in place on the machine by snaps 22' and preferably overlaps and is secured to the lower edges of the fabric shields 38—39 as shown in Figures 4 and 5.

Figures 19, 19A, 20:
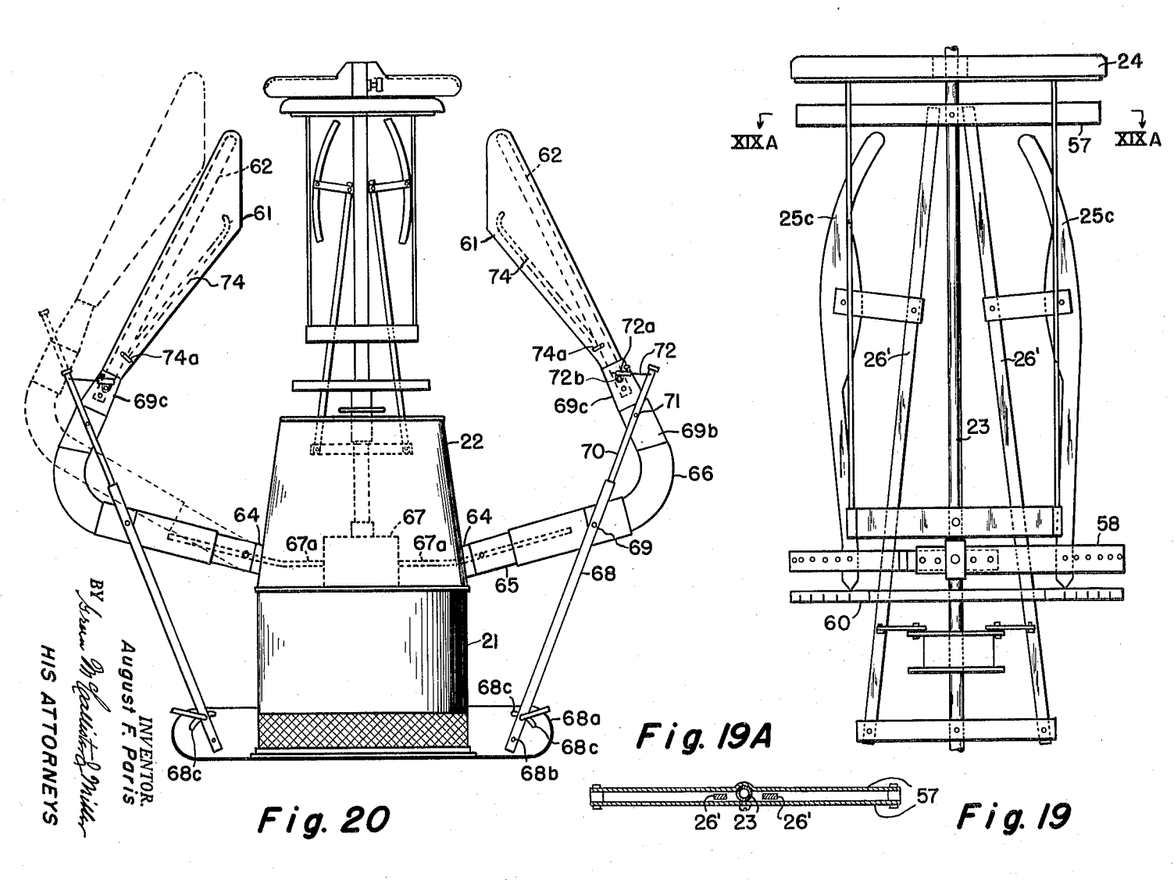
Figure 19 is a diagrammatic view of apparatus forming a part of a pressing machine and discloses modified arrangement of expanding bars and the operating arms therefor.
Figure 19A is a sectional view taken along the line XIXA—XIXA of Figure 19.
Figure 20 is a more or less diagrammatic view of a forming and pressing machine such as illustrated in Figures 1, 2 and 3, and discloses the same as equipped with separate sleeve pressing and finishing apparatus.

In Figure 19 I have shown a portion of a machine such as is illustrated in Figures 1, 2 and 3, but which includes structural features not disclosed in those figures. For example, guide bars 57 are secured to the center post 23 at a point adjacent the neck and shoulder portion 24 and the support bars 26' are extended upwardly so that their upper ends are located between and are guided by the spaced guide bars 57. Another feature of the apparatus shown in Figure 19 is that it is equipped with elongated expander bars 25c and is also provided with an arrangement of guide bars 58 which replace the guide bars 28 of Figures 1, 2 and 3 and which not only function to guide the support members 26' as they swing to different positions about their fulcrum points, but which also provide a pivotal support for the lower ends of the expander bars 25c. Thus, each expander bar 25c may be pivotally secured to the guide bars 58 by a separate bolt so that the expander bars tilt around the pivot member as the support rods 26' swing about their fulcrum points. The apparatus illustrated in Figure 19 is also provided with a size indicator bar 60 secured to the center post 23 and extending substantially parallel to the guide bars 58 at a point adjacent to the lower ends of the expander bars 25c. Thus the indicator bar 60 aids in adjusting the positions of the expander bars 25c and indicates the size of the garment or of the waist portion of the garment to be processed on the machine.

In Figure 20 I have shown a machine such as is illustrated in Figures 1, 2 and 3 but which is equipped with special means for delivering processing steam and air to the individual sleeves of a sweater or similar garment located on the machine.

As shown, each of the sleeves processing devices consists of a permeable form or bag 61 which is adapted to be inserted into a garment sleeve through the cuff end thereof and which is so mounted that its position may be adjusted to hold the sleeve in a desired position during the processing of the garment and the sleeve. As shown, the form 61 is a fabric bag fitted over a support member or rod 62. One end of the bag is in open communication with a conduit assembly which is shown as made up of a plurality of interfitted conduit or pipe members. As shown, the cone portion 22 of the base portion of the machine, is provided at each side thereof with a short tube 64 which is in open communication with the interior of the base portion. A separate conduit member 65 is fitted over each tube section 64 and forms a part of the conduit assembly, which, as stated, is made up of a number of interfitting pipe or conduit sections so arranged that some or all of them are adjustable with relation to adjacent sections. As shown, the conduit assembly also includes as a part thereof, an elbow-shaped section 66 which is so fitted to adjacent pipe sections that it may be adjusted to different positions relatively thereto. The steam chamber 67 of the machine which is shown as located within the cone portion 22, is provided with two pipes 67a, each of which supplies steam to the interior of one of the conduit assemblies and thus to one of the sleeve forms 61.

In order to support each sleeve form 61 in a desired position, I have provided a special brace mechanism for each conduit assembly. As shown, each brace mechanism includes an elongated tube 68 the lower end of which is pivotally secured to one of two vertical plates 68a. Each plate 68a is welded or otherwise secured to the base portion 21 of the machine. The brace mechanism also includes a rod 70 which is shown telescoped with the tube 68 and capable of being locked thereto by a set screw 69. The plates 68a are located on opposite sides of the base portion 21 of the machine and each brace tube 68 is pivotally secured to one or the other of the plates by a bolt 68b. Each tube 68 is also adapted to be held in a fixed position with relation to its support plate 68a by means of a slot and bolt connection 68c.

The rod 70 of each brace mechanism is secured to one of the conduit sections 69b by means of a special bolt 71. The section 69b is interfitted with a tapered conduit section 69c of the conduit assembly, which is in direct communication with the fabric form or bag 61. The end of the rod 70 is pivotally secured to a short rod 72, which slidably fits into a short tube 72a. A bushing 72b is secured to the tube 72a and extends at right angles thereto. A bolt 73 extends through the bushing and also through the tapered section 69c of the conduit assembly. A set screw 72c is screwed into a tapped aperature in the tube 72a and is arranged to lock the rod 72 to the tube.

The bolt 73 and a second bolt 73a, shown as passing through and secured to the tapered section 69c, engage the rod support 62 and, consequently, position the fabric bag 61 in alignment with the tapered section 69c of the conduit assembly.

A weighted rod 74 is pivotally secured to the rod 62 at a point adjacent the tapered section 69c, and, as shown, is provided with an actuating finger 74a which is accessible on the outside of the fabric bag 61. The rod 74 is adapted to yieldingly hold the bag 61 in an extended position such as illustrated. It, however, is readily movable to a position in which it lies substantially parallel with the rod 62, for the purpose of pulling the sleeve of a garment over the bag. The finger 74a may be employed to swing the rod 74 from one of its two positions to the other.

From the foregoing it will be apparent that the conduit assembly may be adjusted to position the sleeve forms 61 in any desired position with relation to a garment fitted over the cap and shoulder portion of the machine and that then the different parts of the brace mechanism may be locked in the adjusted position and in that way retain each sleeve form in the desired position. It will also be apparent that as steam and air is delivered to the interior of the garment-supporting form forming a part of the machine, steam and air will also be delivered to each sleeve through the corresponding fabric form 61.

From the foregoing it will be apparent that each conduit assembly has two functions, one, to assist in supporting a sleever form 61 and the other to deliver processing fluid from the base portion of the machine to one of the sleever forms. I have shown each assembly as made up of relatively short interfitting parts and it is to be understood that the separate interfitting parts of the assembly are so formed with relation to each other that their positions may be adjusted while maintaining a fluid tight joint between the separate parts.

Figures 21, 23:
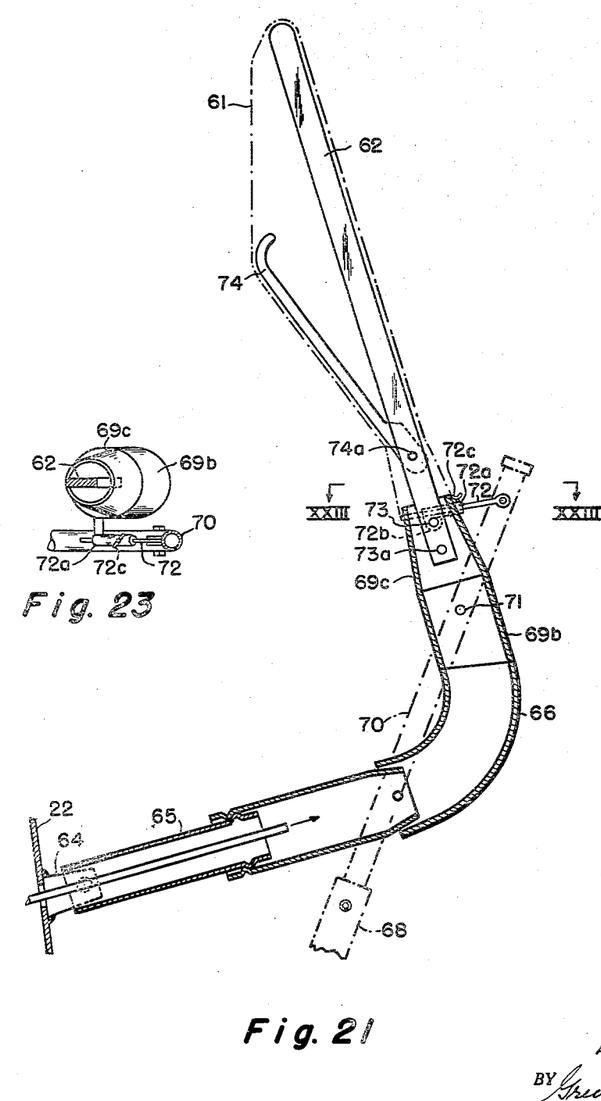
Figure 21 is a diagrammatic view illustrating structural parts of the sleeve processing, pressing and finishing apparatus illustrated in Figure 19.
Figure 23 is a fragmental sectional view taken along the line XXIII—XXIII of Figure 21.
Figure 22:
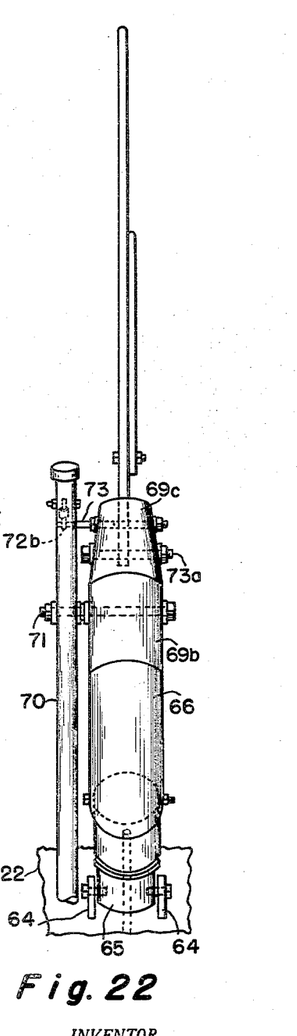
Figure 22 is a fragmental side elevation of the structural parts shown in Figure 21.
Figure 24:
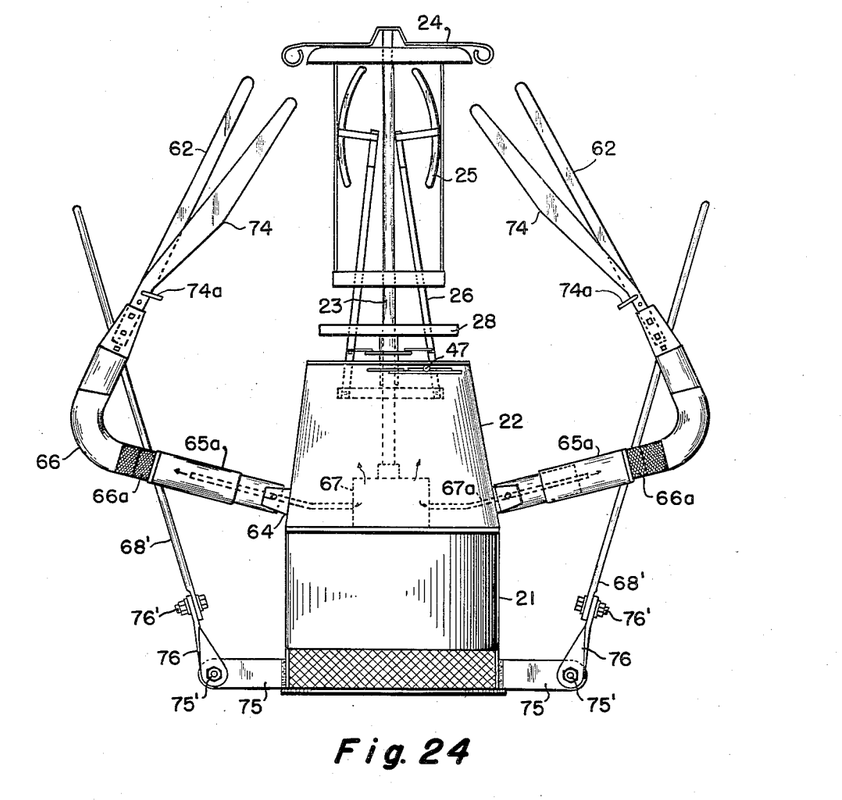
Figure 24 is a diagrammatic view of a machine such as illustrated in Figure 20 but discloses a modified form of apparaus for processing and finishing sleeves of garments such as sweaters.

Figure 21 is a sectional view on an enlarged scale disclosing the conduit assembly, the sleeve form 61 and the support members 62 and 74 for the form. Figure 22 is a side elevation of the apparatus shown in Figure 21 and Figure 23 is a sectional view along the line XXIII—XXIII of Figure 21. Figure 24 is a view corresponding to Figure 20 disclosing the pressing machine equipped with sleevers which are supplied with steam and air through a conduit assembly such as illustrated, and described in connection with Figures 20, 21, 22 and 23.

The fabric form enclosing the support members 62 and 74 is omitted from the apparatus shown in Figure 24. The neck cap and shoulder supports are of slightly different form from the corresponding devices shown in other views of the drawings, but are adapted to be supported on the center bar 23 and may be interchangeable with neck and shoulder supports such as illustrated in Figures 1, 2, 3, 17, 19 and 20. Each of the weighted bars 74 forming a part of the sleever apparatus is shown as provided with an actuating finger 74a of somewhat different form from the finger shown in Figure 20.

The braces 68' shown in Figure 24 are to some extent diagrammatic since it will be apparent that longitudinally extensible brace members, such as shown in Figures 20, 21 and 22, will be employed with the apparatus illustrated in Figure 24. One feature of the braces shown in Figure 24, however, will also be employed in connection with the brace mechanism shown in Figure 20. That is to say, the braces employed in the apparatus illustrated will preferably be so arranged that the sleevers supported thereby may be moved to different positions toward and away from the pressing machine and also forward and back relatively to the machine. For this reason I have shown the braces 68' of Figure 24 pivotally secured to a bracket plate 76 by means of a bolt connection 76'. Each bracket plate is pivotally secured to, and supported by one or the other of two oppositely disposed fixed brackets 75 which are secured to the base portion of the machine and project laterally thereof. Each plate 76 is pivotally secured to its supporting bracket by means of a bolt connection 75'. This arrangement of apparatus makes it possible to adjust the position of each sleever in two directions, i. e., forward and back and also laterally. Consequently, a machine so equipped is more effective in processing and finishing garments of different shapes and sizes.

It should also be noted that while I have shown the mechanisms for adjusting the positions of the expander bars and their support arms 26, as manually operated, it will be understood that these mechanisms may be actuated by mechanical means such as a pressure cylinder or by an electric solenoid or such other apparatus as will contribute to rapid and effective adjustment of the expansion bars to accommodate the processing and finishing of different shapes and sizes of garments.

While I have disclosed the preferred embodiment of the present invention and have also indicated certain modifications in the pressing and finishing machine which are to be included as a part of my invention, it will be apparent to those skilled in the art that various changes, additions, modifications and omissions may be made in the apparatus illustrated without departing from the spirit and scope of my invention as defined by the appended claims.

What I claim is:

1. In a garment pressing and finishing machine a base; a vertically extending center post supported on said base; a shoulder-engaging garment support member mounted on said post and spaced from and located above said base; a frame located between said base and said member and comprising a front frame part and a rear frame part spaced from said front frame part; a separate permeable shield secured to each frame part and spaced one from the other; oppositely disposed garment-engaging expansion elements each located between said base and said member, each extending longitudinally of said post, pivotally supported on said frame and movable back and forth between said shields; a separate pivotally mounted actuating arm pivotally secured to each of said elements; and means for simultaneously swinging said arms to move said elements into and out of engagement with a garment positioned on said support member and enveloping said shields.

2. A garment pressing machine, including a base; a garment support structure mounted on and extending above said base; a shoulder support mounted on said structure and located above and spaced from said base; a rigid frame located between said base and said shoulder support and including in its make-up front and rear parts; a separate permeable shield mounted on each of said parts and spaced one from the other; oppositely disposed, elongated, garment-engaging elements each extending substantially longitudinally of said frame with the lower end thereof pivotally mounted on said frame and the upper end thereof movable from and to a position between said permeable shields to thereby move into and out of stretching engagement with the interior of a garment suspended from said shoulder support and surrounding both of said shields; a separate actuating arm operatively connected to each of said elements and a separate pivot support for each such arm mounted on said frame and means for swinging each such arm about its pivot support to thereby move said elements into and out of stretching engagement with a garment suspended from said shoulder support.

3. In a pressing machine, a base; a support structure mounted on and extending vertically above said base; a shoulder support located on said structure above and spaced from said base; a frame mounted on said structure below said shoulder support and including in its make-up a front part and a rear part spaced one from the other; two element-support arms pivotally mounted on said frame and extending upwardly between the front and rear parts of said frame toward said shoulder support; a separate garment engaging element pivotally secured to and adjustable longitudinally of each of said arms, and a separate armhole engaging pin adjustably mounted on each of said elements and adapted to engage a separate armhole of a garment suspended from said support and means located between said arms for swinging the upper ends thereof from and toward each other to thereby move said elements from and to a position between said frame parts and into and out of stretching engagement with a garment suspended from said shoulder support and surrounding said frame parts.

4. In a garment pressing machine, a base; a garment support structure mounted on and extending vertically above said base; a garment support member mounted on said structure above and spaced from said base; a rigid frame located between said base and said support member and including a front part and a rear part spaced one from the other; oppositely disposed garment-engaging and expanding elements, each extending substantially longitudinally of said support structure and located between said base and said garment support member and each movable from and toward each other and from and to a position between said parts of said frame; a separate arm for supporting and actuating each of said elements; a separate pivot support for each of said arms mounted on said frame and means for simultaneously moving each of said arms about its pivot support to thereby move said elements into and out of positions between said frame parts and into and out of stretching engagement with the interior of the body portion of a garment mounted on said support member.

5. In a pressing machine, a base; a support structure mounted on and extending above said base; a garment support member mounted on said structure above and spaced from said base; two support arms pivotally secured to said structure; oppositely disposed garment-engaging elements located between and spaced from said base and said member, each extending longitudinally of said structure, mounted on and adjustable along a separate one of said arms; a separate laterally projecting pin mounted on each of said elements; and means for simultaneously actuating said arms to move said elements into and out of engagement with the interior of a garment suspended from said support member.

6. In a pressing machine, a base; a support structure mounted on and extending above said base; a shoulder-engaging garment support member mounted on said structure above and spaced from said base; two oppositely disposed elongated garment-engaging elements, each located between and spaced from said base and said member and extending upwardly toward said member; a separate laterally projecting pin mounted on each of said elements and adjustable to different positions relatively thereto; a separate actuating arm for each of said elements pivotally secured to said structure; and a single operating mechanism for actuating said arms to move said elements into and out of stretching engagement with the interior of a garment suspended from said member.

7. In a pressing machine, a base; a support structure mounted on and extending above said base; a shoulder-engaging garment support member mounted on said structure above and spaced from said base; two oppositely disposed elongated garment-engaging elements, each located between and spaced from said base and said member and extending upwardly toward said member; a separate laterally projecting pin mounted on each of said elements and adjustable to different positions relatively thereto; a separate actuating arm for each of said elements pivotally secured to said structure; a single operating mechanism for said arms including in its make-up a rotatable disc and separate means for operatively connecting said disc to each of said arms; and means for oscillating said disc.

8. In a pressing machine, a base; a post mounted on and extending above said base; a shoulder-engaging, garment-support member mounted on said structure above and spaced from said base; two oppositely disposed elongated garment-engaging elements, each located between and spaced from said base and said member and extending upwardly toward said member; a separate armhole-engaging pin mounted on each of said elements and movable along and adjustable to different positions relatively thereto; a separate operating mechanism for actuating both of said arms to move said elements into and out of stretching engagement with the interior of a garment supported on said member and including in its make-up a disc encircling and rotatably mounted on said post and means for operatively connecting each arm to said disc and means for actuating said disc.

9. In a garment pressing machine, a base; a two part garment support frame mounted on and extending above said base and including a front part and a rear part spaced one from the other; a shoulder support member mounted on said frame; two support arms pivotally mounted on said frame and extending upwardly between the parts thereof toward said support member; a separate base block mounted on and adjustable longitudinally of each of said arms; a separate garment-engaging and expanding element pivotally secured to each of said blocks; and means located between said arms for simultaneously swinging each of said arms back and forth about its pivot support to thereby move said elements into and then out of stretching engagement with the interior of a garment mounted on said member.

10. In a garment pressing machine, a base; a post supported on and projecting above said base; a garment support member mounted on said post above and spaced from said base; two pivoted, element-support arms mounted on said base and projecting upwardly therefrom toward said support member; a separate garment-engaging element pivotally secured to and adjustable longitudinally of each of said arms; a separate armhole engaging pin adjustably mounted on each of said elements and adapted to engage an armhole of a garment supported on said member and means for simultaneously swinging each of said arms back and forth relatively to said post to thereby move said elements into and out of stretching engagement with the interior of a garment suspended on said member.

11. The combination of elements as defined in claim 10 in which said actuating means includes in its make-up a disc encircling and rotatable mounted on said post; a separate connecting rod pivotally connected to each of said arms and to said disc; and means for turning said disc about said rod to simultanously swing said arms toward and away from said post.

12. In a pressing machine, a base; a support structure mounted on and extending above said base; a garment support member mounted on said structure above and spaced from said base; a rigid frame mounted on said structure below said member and including in its make-up two frame parts spaced one from the other; oppositely disposed garment-engaging elements, each extending longitudinally of said support structure and located between said member and said base; a separate support arm for each of said elements, pivotally secured to said frame at a point below said member; a separate pin adjustably mounted on each of said elements, each such pin adapted to engage a separate armhole of a garment mounted on said support member; and operating means including in its make-up a disc rotatably mounted on said support structure; a separate connecting rod pivotally connected to each such arm and to said disc; and manually operated means for turning said disc to different positions to swing the upper end of each such arm to and from a position between said parts to thereby move said elements from and to positions between said parts and into and out of stretching engagement wtih a garment suspended from said garment support and surrounding said support structure.

References Cited in the file of this patent

UNITED STATES PATENTS

| | | |
|---|---|---|
| 2,378,565 | Locke et al. | June 19, 1945 |
| 2,454,977 | Richa et al. | Nov. 30, 1948 |
| 2,459,962 | Richa et al. | Jan. 25, 1949 |
| 2,460,732 | Brenner et al. | Feb. 1, 1949 |
| 2,736,471 | Jackson | Feb. 28, 1956 |
| 2,740,566 | Glover | Apr. 3, 1956 |
| 2,743,854 | Strike | May 1, 1956 |
| 2,805,009 | Jackson | Sept. 3, 1957 |
| 2,807,396 | Davis | Sept. 24, 1957 |